United States Patent
Wang et al.

(10) Patent No.: US 7,273,914 B2
(45) Date of Patent: Sep. 25, 2007

(54) OLEFIN POLYMERIZATION METHODS

(75) Inventors: Shaotian Wang, Mason, OH (US);
Barbara M. Tsuie, Cincinnati, OH (US); Mark P. Mack, West Chester, OH (US); Edward S. Vargas, Loveland, OH (US); Debra L. Beran, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 11/196,639

(22) Filed: Aug. 3, 2005

(65) Prior Publication Data

US 2007/0032619 A1    Feb. 8, 2007

(51) Int. Cl.
*C08F 4/52*    (2006.01)
*C08F 4/76*    (2006.01)

(52) U.S. Cl. .................. 526/172; 526/161; 526/134; 526/160; 526/170; 526/126; 502/103; 502/300; 502/84; 502/80

(58) Field of Classification Search ............. 526/129, 526/130, 192, 161; 502/63, 84
See application file for complete search history.

(56) References Cited

U.S. PATENT DOCUMENTS

| | | | |
|---|---|---|---|
| 4,752,597 A | 6/1988 | Turner | 502/104 |
| 4,791,180 A | 12/1988 | Turner | 526/160 |
| 5,064,802 A | 11/1991 | Stevens et al. | 502/155 |
| 5,153,157 A | 10/1992 | Hlatky et al. | 502/117 |
| 5,198,401 A | 3/1993 | Turner et al. | 502/155 |
| 5,387,568 A * | 2/1995 | Ewen et al. | 502/104 |
| 5,554,775 A | 9/1996 | Krishnamurti et al. | 556/7 |
| 5,637,660 A | 6/1997 | Nagy et al. | 526/160 |
| 5,902,866 A | 5/1999 | Nagy et al. | 526/133 |
| 6,232,260 B1 | 5/2001 | Nagy et al. | 502/155 |
| 6,399,535 B1 | 6/2002 | Shih et al. | 502/167 |
| 6,559,090 B1 * | 5/2003 | Shih et al. | 502/152 |
| 6,559,251 B1 * | 5/2003 | Wang et al. | 526/127 |
| 6,686,306 B2 | 2/2004 | Shih | 502/113 |
| 6,693,154 B2 | 2/2004 | Liu et al. | 526/134 |
| 6,734,131 B2 | 5/2004 | Shih et al. | 502/80 |
| 6,756,455 B2 | 6/2004 | Nagy et al. | 526/161 |
| 6,794,468 B1 | 9/2004 | Wang | 526/161 |

\* cited by examiner

*Primary Examiner*—David W. Wu
*Assistant Examiner*—Rip A. Lee
(74) *Attorney, Agent, or Firm*—Jonathan L. Schuchardt

(57) ABSTRACT

Methods for making polyolefins are disclosed. One method comprises polymerizing an olefin in the presence of a catalyst system comprising a single-site complex, an agglomerated metal oxide/clay support-activator, and an ionic borate. Including an ionic borate with the support-activator provides an unexpected boost in catalyst activity and gives polyolefins with high molecular weight and improved comonomer incorporation. In another method of the invention, an olefin is polymerized in the presence of an indenoindolyl metal alkylated complex and an agglomerated metal oxide/clay support-activator. Use of alkylated indenoindolyl complexes with the support-activators provides improved activity compared with metal halides.

13 Claims, No Drawings

OLEFIN POLYMERIZATION METHODS

FIELD OF THE INVENTION

The invention relates to methods useful for polymerizing olefins. The methods use catalyst systems that incorporate an agglomerated metal oxide/clay support-activator.

BACKGROUND OF THE INVENTION

The polyolefins industry continues to look for new and better catalyst systems. Ziegler-Natta catalysts are a mainstay, but single-site (metallocene and non-metallocene) catalysts are making inroads. Among other benefits, single-site catalysts can provide polymers with narrow molecular weight distribution, reduced low molecular weight extractables, and enhanced incorporation of α-olefin comonomers. Traditional metallocenes incorporate one or more cyclopentadienyl (Cp) or Cp-like anionic ligands such as indenyl, fluorenyl, or the like, that donate pi-electrons to a central transition metal. In other non-metallocene single-site catalysts, ligands often chelate to the metal through two or more electron donor atoms.

Single-site complexes are normally used in combination with activators, particularly alumoxanes such as methylalumoxane (MAO), triarylboranes (e.g., triphenylborane, "F15"), or ionic borates (e.g., triphenylcarbenium tetrakis (pentafluorophenyl)borate, "F20"). Alumoxanes are less expensive than ionic borates, but they must be used at high aluminum:transition metal mole ratios (typically >1000:1). While the single-site complexes are often expensive to make, the more expensive part of the catalyst system is usually the activator.

Researchers at W.R. Grace & Company recently described catalyst systems that employ, as a combined support-activator, an "agglomerated metal oxide/clay" (see, e.g., U.S. Pat. No. 6,559,090). These support-activators are used in combination with a transition metal complex, such as a conventional metallocene or constrained-geometry complex, to polymerize olefins. As noted in the abstract, the support-activator is a "layered material having a negative charge on its interlaminar surfaces and is sufficiently Lewis acidic to activate the transition metal compound for olefin polymerization." The examples show the advantages of using the agglomerated metal oxide/clay versus spray-dried clay alone or spray-dried silica alone.

According to the '090 patent, it is preferred to "preactivate" single-site complexes by alkylating them, i.e., by replacing electron-withdrawing ligands such as chloride with "at least one less electronic withdrawing L group (e.g., alkyl) which is more easily displaced . . . by the support-activator to cause activation at the metal center Z" (see column 20). "Preactivation permits one to . . . eliminate the use of expensive methylalumoxane or ionizing agents such as boron containing activators (or co-catalysts)." None of the examples employs an activator other than the support-activator.

Indenoindolyl complexes are a well-known class of organometallic complexes used in single-site olefin polymerization catalysts. For some examples, see U.S. Pat. Nos. 6,232,260, 6,559,251, 6,756,455, and 6,794,468. The complexes have not been tested in combination with agglomerated metal oxide/clay support-activators.

Improving catalyst activity is a continuing battle in the field of single site-catalyzed olefin polymerization. Generally, the less catalyst needed, the lower the process cost and the better the ultimate polymer properties. There is also a need for identifying catalysts and methods capable of providing polymers with relatively high molecular weight. While polyolefin molecular weight can easily be reduced by adding hydrogen or another chain-transfer agent, it is more problematic to find ways to increase molecular weight. New ways to capitalize on the inherent structural flexibility of the indenoindolyl ligand framework are also needed. Finally, there is always a need for catalysts and methods that incorporate comonomers more efficiently. This reduces the amount of comonomer that must be charged, and also reduces the amount of comonomer that needs to be recovered and recycled.

SUMMARY OF THE INVENTION

The invention relates to methods for making polyolefins. One method comprises polymerizing an olefin in the presence of a catalyst system comprising a single-site complex, an agglomerated metal oxide/clay support-activator, and an ionic borate. Including an ionic borate with the support-activator boosts catalyst activity and provides polyolefins with high molecular weight and improved comonomer incorporation. The invention includes a similar method in which the complex is an indenoindolyl Group 3-10 metal alkylated complex and no supplemental activator (e.g., ionic borate) is used. The use of alkylated indenoindolyl complexes with the support-activators improves activity compared with metal halides.

DETAILED DESCRIPTION OF THE INVENTION

In one method of the invention, an olefin is polymerized in the presence of a catalyst system comprising a single-site complex, an agglomerated metal oxide/clay support-activator, and an ionic borate.

Olefins suitable for use have at least one polymerizable carbon-carbon double bond. Preferred olefins are ethylene and $C_3$-$C_{20}$ α-olefins such as propylene, 1-butene, 1-hexene, 1-octene, and the like. Mixtures of olefins can be used. Ethylene and mixtures of ethylene with $C_3$-$C_{10}$ α-olefins are particularly preferred.

Single-site complexes suitable for use include metallocene and non-metallocene varieties. Metallocene complexes include a Group 3-10 transition or lanthanide metal, preferably a Group 4-8 transition metal, and two substituted or unsubstituted cyclopentadienyl-type ligands, which may be the same or different, including, e.g., cyclopentadienyl, methylcyclopentadienyl, pentamethylcyclopentadienyl, indenyl, 2-methylindenyl, fluorenyl, tetrahydroindenyl, and the like. For examples of suitable metallocene complexes, see U.S. Pat. Nos. 4,791,180 and 4,752,597, the teachings of which are incorporated herein by reference.

Non-metallocene single-site complexes incorporate a Group 3-10 transition or lanthanide metal and, at most, one Cp-like ligand. Examples include "constrained geometry" or "open architecture" single-site complexes such as those described in U.S. Pat. Nos. 5,064,802 and 6,559,251, the teachings of which are incorporated herein by reference. Other suitable non-metallocene single-site complexes include, for example, one or more heteroatom-containing ligands, such as azaborolinyl (see U.S. Pat. No. 5,902,866), boraaryl (see U.S. Pat. No. 5,554,775), pyridinoxy or quinolinoxy (see U.S. Pat. No. 5,637,660), isoindoline (see U.S. Pat. No. 6,693,154), or the like. The teachings of these patents are incorporated herein by reference.

The single-site complex preferably includes a Group 3-10 transition or lanthanide metal and at least one indenoindolyl ligand (see U.S. Pat. Nos. 6,232,260, 6,559,251, 6,756,455, or 6,794,468, teachings incorporated by reference). The indenoindolyl ligands in these complexes can have [1,2-b] or [2,1-b] fusion of the indene and indole rings. (In the examples below, Complexes C and D have [1,2-b] configuration, while Complexes A and B have [2,1-b] configuration.) The indenoindolyl ligand can be non-bridged (see, e.g., Complexes E and F, below) or bridged (see, e.g., Complexes A-D). The complex can also have "open architecture" as shown in U.S. Pat. No. 6,559,251.

An agglomerated metal oxide/clay support-activator is needed. Suitable support-activators and ways to make them are described in U.S. Pat. Nos. 6,399,535, 6,559,090, 6,686,306, and 6,734,131, the teachings of which are incorporated herein by reference. In particular, the support-activators are intimately combined agglomerates of a metal oxide component and a clay. The metal oxide is preferably silica, alumina, magnesium oxide, aluminum phosphate, titania, zirconia, or chromium (III) oxide. Silica is particularly preferred.

The clay is an ion-containing layered material having interspaces between the layers and sufficient Lewis acidity, when present within the support-activator agglomerate, to activate a single-site organometallic complex. Preferred clays are natural or synthetic montmorillonites, kaolinites, saponites, hectorites, smectites, vermiculites, micas, and the like. The clay can be pretreated with acid or alkali mixtures to exchange some or all of the ions normally present in the untreated clay. Montmorillonite clays are particularly preferred.

In a convenient approach, aqueous slurries of metal oxide and clay are spray dried to give a support-activator in the form of microspheroidal agglomerates (see U.S. Pat. No. 6,559,090). The support-activator preferably has an average particle size less than 100 microns, more preferably less than 50 microns, and most preferably less than 20 microns.

The support-activator preferably has a metal oxide:clay weight ratio within the range of 0.25:1 to 99:1, more preferably from 0.5:1 to 20:1, and most preferably from 1:1 to 10:1. In a particularly preferred support-activator, silica and montmorillonite clay are used within the weight ratio range of 4 to 1.

The support-activator and single-site complex are combined by any suitable method. In one convenient approach, an ether or hydrocarbon solution of the complex is combined with the support-activator to give a slurry. Solvent removal provides a supported (and activated) complex. An incipient-wetness technique can also be used.

The method uses an ionic borate. Suitable ionic borates are well known in the art. They typically include a boron atom bonded to four groups, usually identical, each of which can effectively stabilize a negative charge. An example is the tetrakis(pentafluorophenyl)borate anion. A non-coordinating cation such as triphenylcarbenium ("trityl") or N,N-dimethylanilinium is also present. Preferably, the ionic borate is triphenylcarbenium tetrakis(pentafluorophenyl)borate ("F20"). For additional examples of suitable ionic borates, see U.S. Pat. Nos. 5,198,401 and 5,153,157, the teachings of which are incorporated herein by reference.

The amount of ionic borate used is not critical. Preferably, the molar ratio of boron to transition metal is within the range of 0.1 to 10, more preferably from 0.5 to 5, and most preferably from 0.9 to 1.2. Thus, it is most preferred to use an approximately stoichiometric amount of borate compound relative to the amount of transition metal complex used.

The ionic borate can be combined with the other components in any desired manner. In one approach, the ionic borate is flushed into the reactor with hydrocarbon solvent immediately before or after introducing the supported single-site complex. Preferably, however, the borate is combined with the supported complex prior to adding it to the polymerization reactor (see examples below for preparation of supported catalysts).

Including the ionic borate results in an unexpected boost in catalyst activity. Preferably, the catalyst activity is at least double that of the activity of a similar catalyst system without the ionic borate. Teachings in the art suggest that the support-activators eliminate the need for any MAO or borate activator. In fact, we found that adding MAO actually hurts catalyst activity when the support-activator is present (see Comparative Examples 2 and 3, below). In contrast, however, including a borate has the opposite effect (see Example 1). In our experiments, catalyst activity increased by a factor of 2 to 15 times when a borate was included.

The impact on activity from using an ionic borate with the support-activator does not appear to be complex-specific. While most of our experiments used an indenoindolyl transition metal complex, we observed a remarkable 14-fold boost in activity with a common metallocene, bis(cyclopentadienyl)zirconium dichloride (see Example 8 and Comparative Example 9).

The method provides polyolefins with improved comonomer incorporation, as reflected by their reduced densities. As shown in Table 1, below, when the same amount of comonomer (1-butene or 1-hexene) is used, a lower density product is obtained when an ionic borate is present.

The method also gives polyolefins with increased molecular weights. Preferably, the polyolefin has a weight average molecular weight (Mw) greater than that of a similar polyolefin produced using the same method without the ionic borate. As shown in Table 1, the weight average molecular weight of the polyolefin is significantly higher when an ionic borate is included.

The invention includes a method which comprises polymerizing an olefin in the presence of a catalyst system comprising an indenoindolyl Group 3-10 transition or lanthanide metal alkylated complex and an agglomerated metal oxide/clay support-activator.

Suitable support-activators have already been described. The complexes incorporate at least one indenoindolyl ligand. Such complexes have also been described earlier.

The complexes used in this method are alkylated. By "alkylated," we mean that at least one and preferably at least two of the ligands attached to the transition or lanthanide metal are alkyl groups. Normally, the complexes are made by "alkylating" the corresponding halides with an alkyl aluminum compound, Grignard reagent, or similar alkylating agent. The examples below illustrate how to make zirconium dimethyl complexes from the corresponding dichloro complexes by an alkylation reaction with methylmagnesium bromide (see preparation of Complexes B, D, and F).

We found that alkylating the indenoindolyl complexes significantly boosts their activities. As shown in Table 2, activities increased by a factor of 2 to 5 when the indenoindolyl complex was alkylated prior to combining it with the support-activator.

The following examples merely illustrate the invention. Those skilled in the art will recognize many variations that are within the spirit of the invention and the scope of the claims.

PREPARATION OF ORGANOMETALLIC COMPLEXES

Preparation of a Dimethylsilyl-bridged Indeno[2,1-b]indolyl Cyclopentadienyl Zirconium Dichloride Complex (A)

(a) Preparation of Indeno[2,1-b]indole 1. A mixture of 2-indanone (51.0 g, 0.39 mol) and p-tolylhydrazine hydrochloride (61.4 g, 0.39 mol) is dissolved in glacial acetic acid (525 mL) and is vigorously stirred and heated to reflux. The mixture turns red and is heated for 2 h. After cooling to room temperature, it is poured into ice water (1 L). The precipitate is filtered to afford a solid, which is washed with water (about 1 L). The solid is dissolved in ethyl acetate (1.4 L), activated charcoal is added, and the mixture is gently warmed. The mixture is then cooled and filtered over a pad of Celite. The filtrate is dried over $Na_2SO_4$ filtered, and is then concentrated to 450 mL and cooled to −30° C. for 3 days. The crystalline solid is filtered and washed with chilled (−78° C.) hexanes (2×500 mL). The beige solid is collected and dried under vacuum (47.1 g, 56%).

(b) N-Methylation of 1 to give 2. A slurry of aqueous NaOH (42 mL, 21.5 M, 903 mmol), $C_{16}H_{33}NMe_3Br$ (0.36 g, 0.97 mmol), and 1 (15.0 g, 68.4 mmol) is combined with toluene (50 mL). A solution of MeI (8.0 mL, 129 mmol) in toluene (15 mL) is added dropwise at room temperature. The mixture is stirred at room temperature for 2.5 h and then refluxed for an hour. The mixture turns red and is cooled to room temperature and filtered. The crystalline solid is washed with chilled (−30° C.) EtOH (200 mL) followed by chilled hexanes (200 mL) to afford a pale red solid (10.3 g, 65%).

(c) Anion generation: Preparation of 3. n-Butyllithium (13.0 mL, 2.5 M in hexanes, 32.5 mmol) is added at room temperature to a slurry of 2 (4.94 g, 21.1 mmol) in toluene (125 mL). The mixture is maintained at room temperature and turns pale yellow. A precipitate forms after 2 h. After 2 days, the mixture is filtered to give a pale beige solid. The solid is washed with toluene (60 mL), followed by hexanes (30 mL), and is then collected and dried under vacuum (4.37 g, 87%).

(d) Preparation of Dianion 4. Product 3 (4.57 g, 19.1 mmol) is suspended in toluene (100 mL). Diethyl ether (40 mL) is added dropwise to afford an orange solution, which is added to a solution of $SiCl_2Me_2$ (12.0 mL, 98.9 mmol) in $Et_2O$ (100 mL) at room temperature. The mixture turns cloudy and dirty beige and is stirred for 3 days and filtered to give a dark red-orange solution. Volatiles are removed under reduced pressure to afford an oily solid. An aliquot is analyzed by $^1H$ NMR, revealing formation of the desired product; 100% conversion is presumed. The oily solid is dissolved in $Et_2O$ (140 mL), and NaCp (11.0 mL, 2.0 M in THF, 22 mmol) is added. A precipitate forms immediately, and stirring continues for 2 days. The mixture is washed with water (3×50 mL), and the organic phase is dried over $Na_2SO_4$ and filtered. Volatiles are removed under vacuum to give an oily residue, and 100% conversion is assumed. The residue was dissolved in $Et_2O$ (75 mL) and cooled to −78° C. n-Butyllithium (18.0 mL, 2.5 M in hexanes, 45.0 mmol) is added by syringe, and the mixture is warmed to room temperature slowly. A yellow solid precipitates overnight, and volatiles are removed under vacuum. The crude material is washed with hexanes (100 mL) and filtered to afford a yellow powder. The powder is collected and dried under vacuum (6.73 g, 93%).

(e) Preparation of Complex A. Zirconium tetrachloride (3.15 g, 13.5 mmol) is combined with toluene (100 mL) and dissolved in $Et_2O$ (50 mL) to produce a cloudy suspension. Dianion 4 (5.02 g, 13.7 mmol) is added as a solid in portions over the course of 30 min. The color turns from yellow to dark orange, and a precipitate forms. The mixture is maintained at room temperature for 2 days and is filtered to give a dirty yellow solid. The solid is washed with toluene (50 mL) and hexanes (50 mL). The yellow powder is collected and dried under vacuum (3.72 g, 53%).

Preparation of a Dimethylsilyl-bridged Indeno[2,1-b]indolyl Cyclopentadienyl Zirconium Dimethyl Complex (B)

Methylmagnesium bromide (3.0 mL, 3.0 M in $Et_2O$, 9.0 mmol) is added by syringe to a slurry of A (2.10 g, 4.08 mmol) in THF (60 mL) at room temperature. The solids dissolve immediately. The mixture turns magenta and is stored overnight. Volatiles are removed under vacuum, and the residue is dissolved in dichloromethane (30 mL). 1,4-Dioxane (0.8 mL, 9.35 mmol) is added; a precipitate forms immediately. The mixture stirs for 10 min. and is filtered through Celite filter aid. The purple filtrate is cooled to −35° C. overnight to afford a yellow crystalline solid (0.932 g, 48%), which is identified as the desired zirconium dimethyl complex, B.

Preparation of a Dimethylsilyl-bridged Indeno[1,2-b]indolyl Cyclopentadienyl Zirconium Dichloro Complex (C)

(a) Preparation of Indeno[1,2-b]indole 5. A mixture of 1-indanone (30.6 g, 232 mmol), p-tolylhydrazine hydrochloride (37.0 g, 233 mmol) in EtOH (350 mL), and aqueous HCl (12 N, 18 mL) is heated to reflux for 90 min. The mixture is cooled and filtered, and the solid is washed with EtOH (600 mL) followed by 20% aqueous EtOH (400 mL) and finally hexanes (200 mL). The off-white solid is dried under vacuum (36.5 g, 72%).

(b) N-Methylation of 5. A mixture of 5 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of MeI (17.0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) EtOH (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 6 (total yield 25.7 g, 66%).

(c) Anion generation: Preparation of 7. n-Butyllithium (120 mL, 2.5 M, 1.6 mol) is added dropwise to a solution of 6 (43.9 g, 188 mmol) in toluene (560 mL). A precipitate forms after an hour. The mixture is allowed to stand for 48 h and is filtered. The solid is washed with toluene (500 mL), then hexanes (500 mL), and is dried under vacuum (40.3 g, 90%).

(d) Reaction with Dichlorodimethylsilane to give 8. A solution of 7 (23.3 g, 97.4 mmol) in toluene (240 mL) and Et$_2$O (160 mL) is added to a solution of SiCl$_2$Me$_2$ (60.0 mL, 495 mmol) in Et$_2$O (170 mL). The mixture becomes cloudy and is stirred for 48 h and filtered over Celite. Volatiles are removed under vacuum to afford a gray solid (24.8 g, 78%).

(e) Dianion generation: Preparation of 9. Sodium cyclopentadienide (16.0 mL, 2 M, 32.0 mmol) is added to a solution of 8 (9.62 g, 29.5 mmol) in Et$_2$O (240 mL). A solid forms immediately, and the mixture is maintained at room temperature overnight. The crude mixture is washed with H$_2$O (100 mL). The organic phase is dried over Na$_2$SO$_4$ and filtered. Evaporation to dryness gives an oil. The oil is dissolved in Et$_2$O (250 mL) and cooled to −78° C. n-Butyllithium (28.0 mL, 2.5 M, 70.0 mmol) is added dropwise and the mixture warms slowly to room temperature. Stirring continues for 24 h. A yellow solid forms, the mixture is filtered, and the solid is dried under vacuum (12.3 g, 99%).

(f) Preparation of Zirconium Dichloride Complex C. Dianion 9 (7.94 g, 21.6 mmol) is added as a solid to a solution of ZrCl$_4$ (5.03 g, 21.6 mmol) in toluene (250 mL) and Et$_2$O (50 mL). The mixture turns orange and is maintained at room temperature for 48 h and then filtered. The solid (C) is washed with toluene (200 mL), then hexanes (50 mL), and is dried under vacuum (4.0 g, 36%).

Preparation of a Dimethylsilyl-bridged Indeno[1,2-b]indolyl Cyclopentadienyl Zirconium Dimethyl Complex (D)

Methylmagnesium bromide (5.0 mL, 3.0 M in Et$_2$O, 15 mmol, from Aldrich) is added at room temperature to a slurry of C (3.5 g, 6.8 mmol) in THF (80 mL) with vigorous stirring. The slurry turns deep orange after 3 h. The mixture, kept at room temperature overnight, turns yellow. Volatiles are removed under vacuum, and dichloromethane (100 mL) is added to give a yellow-orange solution. Addition of 1,4-dioxane (2.0 mL, 23.5 mmol) induces precipitation. The mixture is stirred for about 2 h, and is then filtered through Celite filter aid to provide a yellow-orange solution. This is concentrated to about 90 mL and is cooled to −35° C. overnight. The resulting crystalline material is filtered, washed with chilled (−35° C.) dichloromethane (10 mL), and dried to give zirconium dimethyl complex D (1.99 g, 62%). Additional D can be recovered from the mother liquor.

Preparation of a Non-Bridged Indeno[1,2-b]indolyl Cyclopentadienyl Zirconium Dichloride Complex (E)

A 250-mL flask equipped with stir bar is charged with 7 (10.0 g, 42.0 mmol) and toluene (95 mL) to make an orange slurry. Diethyl ether (35 mL) is added slowly to afford a dark orange solution. This solution is added over the course of 15 minutes at room temperature to a slurry of (C$_5$H$_5$)ZrCl$_3$ (11.1 g, 42.0 mmol) in toluene (190 mL) and Et$_2$O (190 mL) under vigorous stirring. The mixture turns deep red and is maintained at room temperature overnight. The slurry is filtered, and the red solid (complex E) is collected and dried under vacuum (16.5 g, 78%).

Preparation of a Non-Bridged Indeno[1,2-b]indolyl Cyclopentadienyl Zirconium Dimethyl Complex (F)

A solution of methylmagnesium bromide (4.4 mL, 3.0 M in Et$_2$O, 13 mmol) is added at room temperature to a slurry of dichloride complex E (3.17 g, 6.31 mmol) in diethyl ether (150 mL). The mixture, kept at room temperature overnight, turns green. The mixture is filtered through Celite filter aid to give an orange solution. 1,4-Dioxane (1.5 mL, 17.6 mmol) is added to the filtrate, which is stirred for 0.5 h and filtered. The yellow solution is cooled to −15° C. overnight to induce crystallization. The resulting dimethyl complex, F, is filtered and dried under vacuum (1.32 g, 50%).

PREPARATION OF TREATED SUPPORTS

General Procedure

An agglomerated silica-clay support-activator (ave. particle size 19 or 38 μm, prepared as described in U.S. Pat. No. 6,559,090) is combined with triisobutylaluminum, TIBAL (1.0 M solution in heptane) or triethylaluminum, TEAL (1.0 M solution in toluene) with stirring at room temperature in a glove box under nitrogen (see Table A). The mixed slurry is stirred for 2 more hours at room temperature. After vacuum drying at room temperature, the treated support-activator is isolated.

TABLE A

| | Treated Supports | | |
|---|---|---|---|
| Treated Support | Ave. Part. Size (μm) | Treating Agent | mmol Treating Agent per g of Support-Activator |
| U | 38 | TIBAL | 5.0 |
| V | 19 | TIBAL | 5.0 |
| W | 19 | TIBAL | 1.0 |
| X | 19 | TEAL | 1.0 |

PREPARATION OF SUPPORTED CATALYSTS

General Procedure

A solution of zirconium complex (A, B, C, D, E, F or G; about 0.02 mmol) in toluene (3 mL) is added to a TIBAL or TEAL-treated agglomerated silica/clay support-activator (U, V, W, or X; 1.0 g) in a 25-mL flask with stirring at room temperature in a glove box under nitrogen. The mixed slurry stirs for another 0.5 h at room temperature. After vacuum drying at room temperature, the desired supported catalyst (A1, D1, F1, G1, C1, D2, B1, A2, C2, or E1) is isolated. See Tables 1 and 2.

BORATE MODIFICATION OF SUPPORTED CATALYSTS

General Procedure

In a glove box at room temperature, triphenylcarbenium tetrakis(pentafluorophenyl)borate (1.9 mL of 0.005 M solution in toluene, B:Zr molar ratio=1.1) is added to a sample of supported catalyst (A1, D1, F1, G1, C1, or D2) (0.40 g) in a 25-mL flask with magnetic stirring. The slurry stirs for another 0.5 h at room temperature. After vacuum drying at room temperature, the borate-modified supported catalyst (designated A1-B, D1-B, F1-B, G1-B, C1-B, or D2-B) is isolated. See Tables 1 and 2.

MAO MODIFICATION OF SUPPORTED CATALYST

Preparation of Supported Catalyst A1-M

In a glove box at room temperature, methylalumoxane (0.2 mL of 30 wt. % solution in toluene, 4.2 M, product of Albemarle) is diluted with toluene (4.0 mL) and then mixed with complex A (10.8 mg, 0.021 mmol Zr, Al:Zr molar ratio=40) at room temperature for about 10 minutes. The deep red solution is then added to the treated support W (1.0 g) in a 25-mL flask with magnetic stirring. The slurry stirs for another 0.5 h at room temperature. After vacuum drying at room temperature, about 1 g of the desired MAO-containing supported catalyst, designated A1-M, is obtained.

ETHYLENE COPOLYMERIZATIONS

Ethylene/1-Hexene Copolymerizations

A one-liter, stainless-steel autoclave reactor is charged with 1-hexene (40 mL). Stadis® 425 additive (1 mg in 0.25 mL heptane, product of Octel-Starreon) and triisobutylaluminum (TIBAL, 1.0 mL of 1.0 M solution in heptane) are pre-loaded in the side-arm of an injector in a glove box. The mixture is then flushed into the reactor with isobutane (500 mL). No hydrogen is added. Ethylene is added to the reactor (total reactor pressure: 320 psig), and the contents are allowed to equilibrate at 80° C.

About 60 mg of supported catalyst (see Table 1 or 2) is pre-loaded into a sidearm of the injector in a glove box. The mixture is then flushed into the reactor with isobutane (50 mL) and nitrogen pressure. The polymerization proceeds for 30 minutes. The reactor is vented, and the resulting polymer is collected and dried under vacuum. Catalyst activities and polymer properties are summarized in Tables 1 and 2.

Ethylene/1-Butene Copolymerizations

A one-liter, stainless-steel autoclave reactor is charged with 1-butene (5 mL). Armostat® 710 fatty amine (1 mg in 0.25 mL heptane, product of Akzo Nobel) and triisobutyla-luminum (TIBAL, 0.5 mL of 1.0 M solution in heptane) are pre-loaded in the side-arm of an injector in a glove box. The mixture is then flushed into the reactor with isobutane (440 mL). No hydrogen is added. Ethylene is added to the reactor (total reactor pressure: 310 psig), and the contents are allowed to equilibrate at 75° C.

About 60 mg of supported catalyst (see Table 1 or 2) is pre-loaded into a sidearm of the injector in a glove box. The mixture is then flushed into the reactor with isobutane (50 mL) and nitrogen pressure. The polymerization proceeds for 30 minutes. The reactor is vented, and the resulting polymer is collected and dried under vacuum. Catalyst activities and polymer properties are summarized in Tables 1 and 2.

The results in Table 1 demonstrate that including an ionic borate with the support-activator boosts catalyst activity and provides polyolefins with high molecular weight and improved comonomer incorporation. Interestingly, a similar improvement is not realized by including MAO as the supplemental activator (see Comparative Example 2); in fact, the activity actually decreases with added MAO.

As the results in Table 2 demonstrate, use of alkylated indenoindolyl complexes with the support-activators improves activity compared with that of indenoindolyl metal halides. The activity boost is about 2 to 5 times that available from the chloride complexes.

The preceding examples are meant only as illustrations. The following claims define the invention.

Organometallic Complexes Used in the Examples

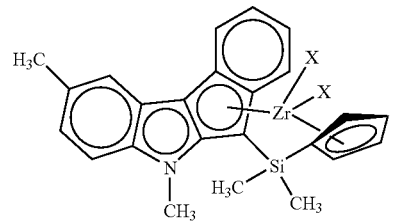

A (X = Cl)
B (X = CH$_3$)

Bridged indeno[2,1-b]indolyl

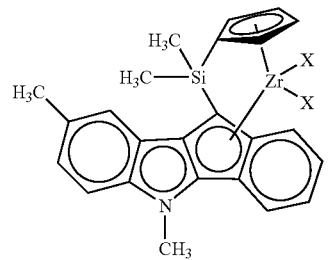

C (X = Cl)
D (X = CH$_3$)

Bridged indeno[1,2-b]indolyl

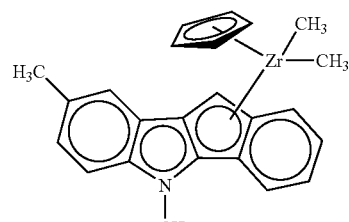

E (X = Cl)
F (X = CH$_3$)

Non-bridged indeno[1,2-b]indolyl

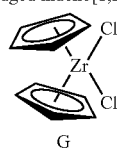

G

TABLE 1

Effect of Borate Activator

| Ex # | Complex | Treated Support | Supported Catalyst | Added Activator | Comonomer | Activity | Mw | Mw/Mn | Density (g/cm$^3$) |
|---|---|---|---|---|---|---|---|---|---|
| 1 | A | W | A1-B | F20 | C4 | 5500 | high | — | 0.927 |
| C2 | A | W | A1-M | MAO | C4 | 680 | $2.5 \times 10^5$ | 3.5 | 0.928 |
| C3 | A | W | A1 | none | C4 | 2030 | $2.2 \times 10^5$ | 2.9 | 0.931 |
| 4 | D | X | D1-B | F20 | C4 | 4540 | high | — | 0.918 |
| C5 | D | X | D1 | none | C4 | 330 | $5.6 \times 10^5$ | 4.6 | 0.926 |
| 6 | F | V | F1-B | F20 | C4 | 2730 | $2.7 \times 10^5$ | 4.3 | 0.939 |
| C7 | F | V | F1 | none | C4 | 1260 | $2.0 \times 10^5$ | 4.2 | 0.940 |
| 8 | G | X | G1-B | F20 | C4 | 1400 | $2.3 \times 10^5$ | 3.4 | 0.933 |
| C9 | G | X | G1 | none | C4 | 100 | — | — | — |
| 10 | C | U | C1-B | F20 | C6 | 3020 | $2.7 \times 10^5$ | 2.5 | 0.906 |
| C11 | C | U | C1 | none | C6 | 240 | — | — | — |
| 12 | D | U | D2-B | F20 | C6 | 8200 | $2.9 \times 10^5$ | 2.8 | 0.908 |
| C13 | D | U | D2 | none | C6 | 1210 | $2.8 \times 10^5$ | 5.0 | 0.919 |

C6 = 1-hexene (40 mL); C4 = 1-butene (5 mL). Activities are in g polymer per g catalyst per hour. Mw and Mw/Mn are determined by GPC. Densities by ASTM D1505-96.

TABLE 2

Effect of Using an Alkylated Indenoindolyl Complex

| Ex # | Complex | Treated Support | Supported Catalyst | Complex Type | Comonomer | Activity | Mw | Mw/Mn | Density (g/cm$^3$) |
|---|---|---|---|---|---|---|---|---|---|
| 14 | B | X | B1 | —Me$_2$ | C4 | 780 | $2.4 \times 10^5$ | 3.1 | 0.932 |
| C15 | A | X | A2 | —Cl$_2$ | C4 | 350 | — | — | — |
| 16[1] | D | X | D1 | —Me$_2$ | C4 | 330 | $5.6 \times 10^5$ | 4.6 | 0.926 |
| C17 | C | X | C2 | —Cl$_2$ | C4 | 100 | — | — | — |
| 18[2] | F | V | F1 | —Me$_2$ | C4 | 1260 | $2.0 \times 10^5$ | 4.2 | 0.940 |
| C19 | E | V | E1 | —Cl$_2$ | C4 | 780 | $1.7 \times 10^5$ | 4.2 | 0.941 |
| 20[3] | D | U | D2 | —Me$_2$ | C6 | 1210 | $2.8 \times 10^5$ | 5.0 | 0.919 |
| C21[4] | C | U | C1 | —Cl$_2$ | C6 | 240 | — | — | — |

C6 = 1-hexene (40 mL); C4 = 1-butene (5 mL). Activities are in g polymer per g catalyst per hour. Mw and Mw/Mn are determined by GPC. Densities by ASTM D1505-96.
[1]Same as Comparative Example 5;
[2]Same as Comparative Example 7;
[3]Same as Comparative Example 13;
[4]Same as Comparative Example 11.

We claim:

1. A method comprising polymerizing an olefin in the presence of a catalyst system comprising a single-site complex, an agglomerated metal oxide/clay support-activator, and an ionic borate, wherein the complex complex comprises a Group 3-10 transition or lanthanide metal and at least one indenoindolyl ligand.

2. The method of claim 1 wherein the complex is a bridged indeno [1,2-b]indolyl complex.

3. The method of claim 1 wherein the complex is a bridged indeno [2,1-b]indolyl complex.

4. The method of claim 1 wherein the complex is alkylated.

5. The method of claim 1 wherein the support-activator is prepared from silica and montmorillonite clay.

6. The method of claim 5 wherein the support-activator has a silica:clay weight ratio within the range of 0.25:1 to 99:1.

7. The method of claim 1 wherein the ionic borate is triphenylcarbenium tetrakis(pentafluorophenyl)borate.

8. The method of claim 1 wherein the catalyst activity is at least double that of the activity of a similar catalyst system without the ionic borate.

9. The method of claim 1 wherein the resulting polyolefin has a density less than that of a similar polyolefin produced using the same method without the ionic borate.

10. The method of claim 1 wherein the resulting polyolefin has a weight average molecular weight greater than that of a similar polyolefin produced using the same method without the ionic borate.

11. A method which comprising polymerizing an olefin in the presence of a catalyst system comprising an idenoindolyl Group 3-10 transition or lanthanide metal alkylated complex and an agglomerated metal oxide/clay support-activator.

12. The method of claim 11 wherein the catalyst system includes an ionic borate.

13. The method of claim 12 wherein the ionic borate is triphenylcarbenium tetrakis(pentafluorophenyl)borate.

* * * * *